Feb. 6, 1934.  J. GASKELL  1,945,890
APPARATUS FOR THE PRODUCTION OF WELDED WIRE FABRIC
Filed Sept. 9, 1931  3 Sheets-Sheet 1

Inventor.
JOSEPH GASKELL
Morrison Kennedy & Campbell
Attorneys

Feb. 6, 1934.  J. GASKELL  1,945,890
APPARATUS FOR THE PRODUCTION OF WELDED WIRE FABRIC
Filed Sept. 9, 1931

Inventor.
JOSEPH GASKELL

Attorneys

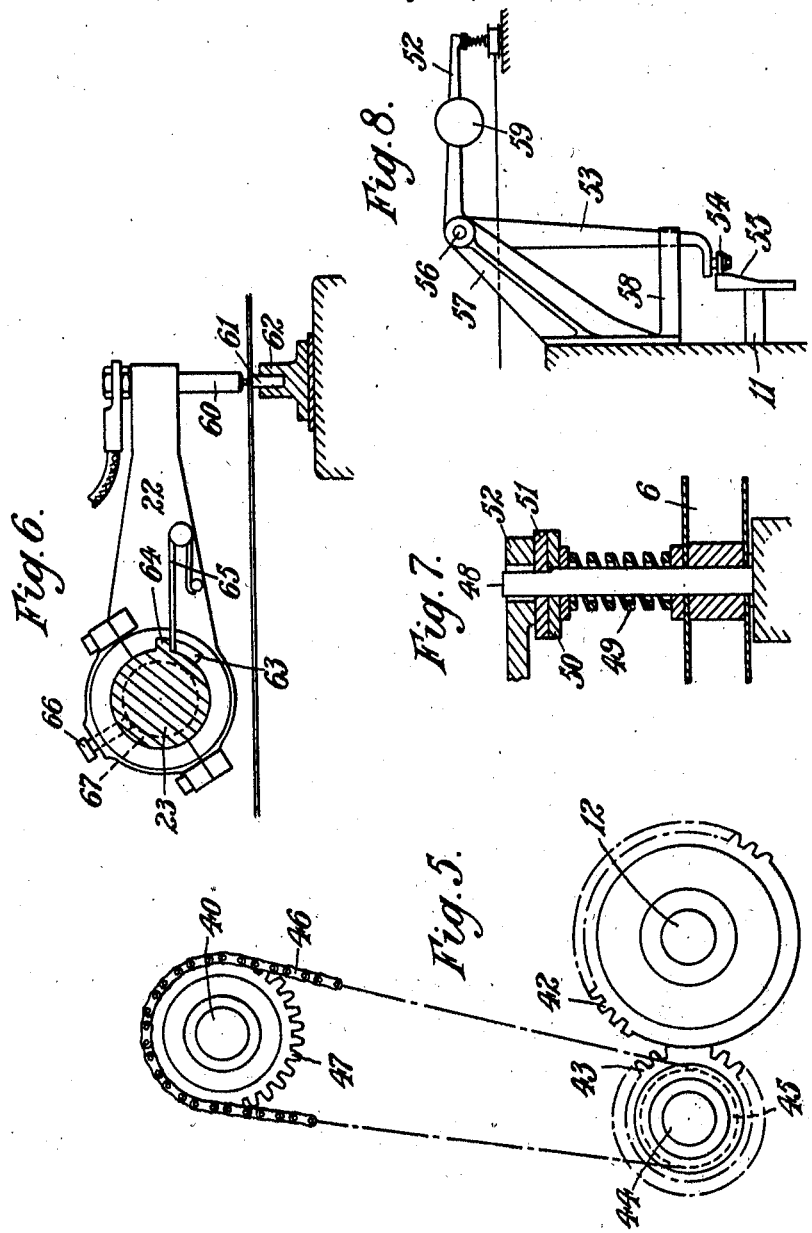

Patented Feb. 6, 1934

1,945,890

UNITED STATES PATENT OFFICE 1,945,890

APPPARATUS FOR THE PRODUCTION OF WELDED WIRE FABRIC

Joseph Gaskell, St. Helens, England, assignor to Pilkington Brothers Limited, Liverpool, England Application September 9, 1931, Serial No. 561,967, and in Great Britain September 15, 1930

8 Claims. (Cl. 140—112)

This invention relates to apparatus for making electrically-welded wire fabric, with diamond-shaped meshes, in which the diagonals of the diamonds are longitudinal and transverse of the fabric, and has for its object improvements in the process and apparatus of making the same.

According to the invention, a first wire laying and welding machine, lays inclined wires across selvedge wires and welds them to the selvedge wires to form a partly finished fabric, and a second wire laying and welding machine geared to the first to operate synchronously therewith, lays oppositely inclined wires across the partly finished fabric and welds them to the wires thereof, the partly finished fabric being kept taut in its passage from the first to the second machine, and the wires laid by the first machine being retained in correct position close to the welding line of the second machine.

The invention also comprises an improved apparatus for opening and closing the welding dies, the parts thereof having small inertia and being adapted for rapid operation. For the efficient working of the apparatus there is provided a device whereby the frictional brake on each wire spool required to give correct wire tension, is released during the periods when the spool starts its rotation, but this brake device forms no part of the present invention and indeed constitutes the subject matter of a separate patent application.

In the accompanying drawings:—

Figure 5 is a side elevation of the driving mechanism therefor;

Figure 6 is a side elevation of one of the die arms;

Figure 7 is a vertical section of one of the wire spools;

Figure 8 is an elevation of the mechanism for varying the friction thereof, and

Figure 1:
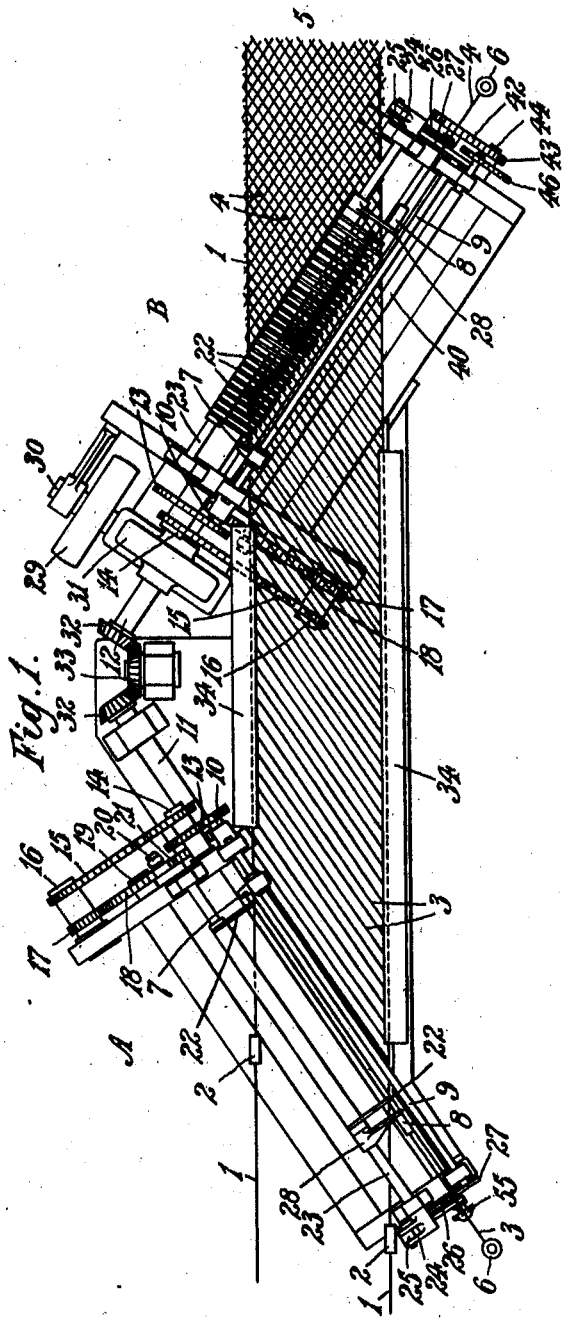
Figure 1 is a plan view showing the apparatus, omitting certain details.

Referring to Figure 1, the apparatus comprises two machines A and B adapted to lay a succession of single wires across other wires at an angle thereto and to weld them to the said other wires. Such machines may be of any suitable type and do not form part of this invention. The two machines shown in Figure 1 are of the type of the machine for making rectangular mesh fabric shown and described in Letters Patent No. 1,661,156. They will not, therefore, be described in detail, and the selvedge wire spools and the feed drum for the fabric are omitted from the drawings.

Two selvedge wires 1, passing through guide nozzles 2, pass through the two machines. Machine A lays wires 3 across the selvedge wires 1 and welds them thereto. A plurality of selvedge wires may be provided, preferably an outer thick and an inner thin wire is provided at each edge. The partly finished fabric thus formed, passes to machine B which lays wires 4 across the wires 1 and 3 and welds them thereto, forming the finished fabric 5 which passes to the feed drum and finished fabric roll, as described and shown in the above-mentioned Letters Patent.

Figure 9:
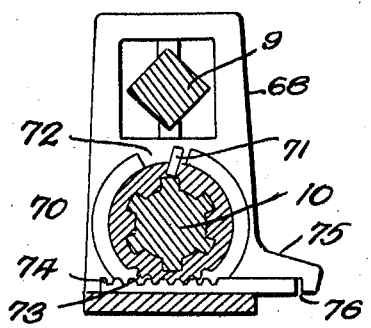
Figure 9 is an end view, partly in section, showing a wire gripping finger.

The wires 3 and 4 are drawn from spools 6 through guide nozzles 8 by fingers 7. One of the fingers 7 is shown in Figure 9. A block 68 is guided on a rod 9 and is traversed to and fro from one end of the machine to the other by a lead screw 10. This screw engages a nut 70, held in the block 68 against endwise movement, but capable of a small rotary movement, limited by the movement of the pin 71, attached to the nut, in a slot 72 in the block.

Teeth 73 are formed on the lower part of the nut 70 and engage teeth in a bar 74 adapted to slide endwise in the block 68. A projection 75 from the block 68 co-operates with one end of the bar 74 to form a pair of jaws 76 adapted to grip the wires 3 and 4.

On rotation of the screw 10 counter-clockwise (as seen in Figure 9), the nut 70 is first turned with the screw, and its rotation moves the bar 74 to the right to close the jaws 76 and grip the wire. Further rotation of the screw 10 causes the block 68 to traverse along the machine, drawing the wire with it.

When the block 68 reaches the other end of the machine, the rotation of the screw 10 is stopped and the block is held stationary, holding the wire in the jaws 76, while it is being welded. The rotation of the screw 10 is then reversed and the bar 74 is first moved to the left to open the jaws 76 and the block 68 is then traversed back. The shafts 10 of the lead screws, are driven from the main shafts 11 and 12 of the machines A and B respectively, by chains 13 connecting wheels on the shafts 10 and on studs 14, chains 15 connecting wheels on the studs 14 and 16, gear wheels 17 on the studs 16, gear sectors 18 on studs 19, and connecting rods 20 connecting the gear sectors 18 with pins on intermittent gear wheels driven by the intermittent gear wheels 21 on the main shafts 11 and 12. This gearing and a finger similar to that above described are fully described in the above-mentioned Letters Patent No. 1,661,156.

The welding is effected by die-arms 22 mounted on, and actuated by, shafts 23, to be more fully described hereinafter. The shafts 23 are reciprocated by crank-arms 24, links 25 and lever arms 26 engaging cams 27 on the main shafts 11 and 12.

After the wires 3 and 4 have been gripped by the die-arms 22, they are cut off at the nozzles 8 by knives 28 on the shafts 23. Current is then passed through the dies to weld the wires.

Machine B is driven by pulley 29 on worm-shaft 30 driving a worm-wheel on the main shaft 12 in the casing 31. The drive is connected to the main shaft 11 of machine A by bevel wheels 32 on the main shafts and idle bevel wheel 33. The two machines are thereby driven synchronously, so that their welding dies operate substantially at the same time.

Figure 2:
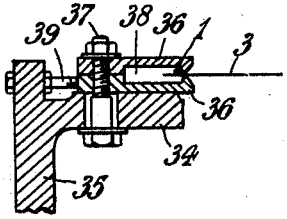
Figure 2 is a transverse section through one of the guides for the partly finished fabric.

The partly finished fabric is guided and held taut in its passage from machine A to machine B by guides 34, one of which is shown on an enlarged scale in Figure 2 in transverse section. The support 35 carries two bars 36 clamped together and to the support 35 by bolts 37. The bars 36 are separated at their right-hand edges (Figure 2) by a distance which just allows passage for the wires 3, but not for the selvedge wire 1 welded thereto. The selvedge wire 1 passes within the channel 38 formed between the two bars 36, and is retained therein by the side wall of the channel. The bars 36 of the two guides 34 can be adjusted to and from each other, to adjust the transverse tension on the partly finished fabric, by screws 39.

Figure 3:
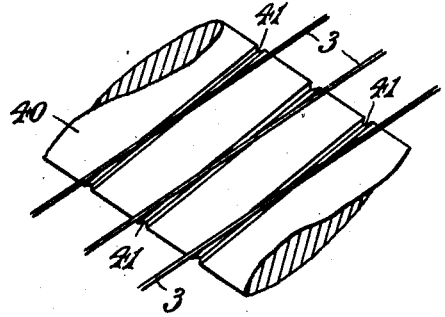
Figure 3 is a plan view of part of the guide screw for the partly finished fabric.
Figure 4:
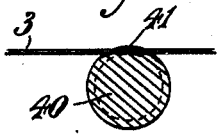
Figure 4 is a cross section thereof on a reduced scale.

The wires 3 of the partly finished fabric are guided and retained in their correct position on a line close to the line of welding dies of machine B by a screw 40, see particularly Figures 3 and 4. The screw-thread is formed by a shallow V-groove 41 and the pitch is such that the grooves on the upper part of the screw are approximately parallel to the wires 3, which, therefore, enter and are guided by the grooves. The driving gear of the screw 40 is shown in Figure 5, and consists of an intermittent gear-wheel 42 on the main shaft 12, engaging an intermittent gear-wheel 43 on a stud 44 which also carries a chain wheel 45 connected by chain 46 with wheel 47 on the screw 40. The gearing is such that, during the period in which the fabric is fed forward through the length of one mesh, the screw 40 is turned sufficiently to bring one groove 41 into the position of the next groove. In the screw shown in Figure 3, the grooves 41 are formed by a double screw thread, and therefore the screw 40 has to be turned through half a revolution.

The spools 6 from which the wires 3 and 4 are drawn, have to be provided with friction brakes in order that the wires may be drawn under suitable tension but, as before stated these friction brakes constitute no part of the present invention. At the moment when the finger 7 starts to draw the wire off thereby turn the spool, the wire is subjected to a considerable extra stress due to the inertia of the spool, and this, combined with the pull required to overcome the friction, may be sufficient to break the wire. By means of the device shown in Figures 7 and 8, the friction of the brake on the spool is removed before the finger 7 starts to draw the wire, and is applied only after the spool has been set in motion. Referring to Figure 7, the spool 6 is adapted to turn on a pin 48. A spring 49 is placed between the spool 6 and two friction washers 50 and 51, the washer 50 together with the spring being free to turn with the spool 6, while the washer 51, being keyed to the pin 48, is held stationary. An arm 52 is adapted to press on the washer 51 and, by its pressure, give rise to friction between the washers 50 and 51. Referring to Figure 8, the arm 52 is one arm of a lever of which the other arm 53 carries a roller 54 engaging a face cam 55 on the main shaft 11. The lever 52, 53, is pivoted at 56 to a bracket 57 on the machine frame, and is guided by guide 58. The arm 52 has adjustably thereon a weight 59 which, when the arm 52 is free to fall, produces a pressure on the washer 51 which gives suitable friction to the rotation of the spool. When the face-cam 55 is in the position shown, the arm 52 is lifted and relieves the pressure between the washers 50 and 51, and the cam 55 is so fixed on the main shaft 11 that it relieves the pressure before the finger 7 starts to draw the wire and restores it before the finger 7 has reached the end of its traverse. The face-cam 55 is shown in Figure 1 on machine A, but without the other parts of the device. A similar device is applied to machine B, but is not shown thereon.

Each of the die-arms 22, as shown in Figure 6, carries an upper welding die 60 which operates in conjunction with the lower welding bar 61 held in the support 62. The two wires shown in this figure, may be either a selvedge wire 1 and a wire 3 or a wire 3 and a wire 4.

The die-arm 22 embraces the shaft 23 and has an arcual slot 63 in which engages a key 64 fixed to the shaft 23. If the shaft 23 be turned through a small angle counter-clockwise from the position shown, the arm 22 will be lifted to separate the welding die and bar 60 and 61. If it be turned through a small angle clockwise from the position shown, so that the key 64 moves downwards in the slot 63, the arm 22 is free rotationally from the shaft 23, but is turned so as to press the wires between the welding die 60 and bar 61 by a spring 65, which acts on the key 64. By the reciprocation of the shaft 23, therefore, the arm 22 is positively lifted and spring-pressed downwards. The arm 22 is located on the shaft 23 by a screw 66 which engages an annular groove 67 in the shaft.

Die-arms of the above-described construction have the advantage of small moments of inertia and of being, therefore, capable of rapid operation.

Having described my invention, I declare that what I claim and desire to secure by Letters Patent is:—

1. Apparatus for making an electrically welded wire fabric with diamond meshes comprising means for successively drawing single inclined wires across selvedge wires, means for welding the said wires to the selvedge wires to form a partly finished fabric, means for successively drawing single oppositely inclined wires across the partly finished fabric and means for welding them to the wires of the partly finished fabric.

2. Apparatus for making an electrically welded wire fabric with diamond meshes comprising means for successively drawing single inclined wires across selvedge wires, means for welding the said wires to the selvedge wires to form a partly finished fabric, means for keeping the partly finished fabric taut by tension applied to the selvedge wires transverse of the fabric, means for successively drawing single oppositely inclined wires across the partly finished fabric and means for welding them to the wires of the partly finished fabric.

3. Apparatus for making an electrically welded wire fabric with diamond meshes comprising means for successively drawing single inclined wires across selvedge wires, means for welding the said wires to the selvedge wires to form a partly finished fabric, means for successively drawing single oppositely inclined wires across the partly finished fabric, means for welding the latter wires to the wires of the partly finished fabric, and a guide member for the wires of the partly finished fabric located close to the latter welding means.

4. Apparatus for making an electrically welded wire fabric with diamond meshes comprising means for successively drawing single inclined wires across selvedge wires, means for welding the said wires to the selvedge wires to form a partly finished fabric, means for keeping the partly finished fabric taut by tension applied to the selvedge wires transverse of the fabric, means for successively drawing single oppositely inclined wires across the partly finished fabric, means for welding the latter wires to the wires of the partly finished fabric, and a guide member for the wires of the partly finished fabric located close to the latter welding means.

5. Apparatus for making an electrically welded wire fabric with diamond meshes comprising means for successively drawing single inclined wires across selvedge wires, means for welding the said wires to the selvedge wires to form a partly finished fabric, a channel adapted to receive each selvedge wire of the partly finished fabric, having a slot permitting passage of the inclined wires, but not of the selvedge wire, means for adjusting the position of at least one of the said channels transverse of the fabric, means for successively drawing single oppositely inclined wires across the partly finished fabric and means for welding them to the wires of the partly finished fabric.

6. Apparatus for making an electrically welded wire fabric with diamond meshes comprising means for sucessively drawing single inclined wires across selvedge wires, means for welding the said wires to the selvedge wires to form a partly finished fabric, means for successively drawing single oppositely inclined wires across the partly finished fabric, means for welding the latter wires to the wires of the partly finished fabric, a rod with at least one helical groove adapted to engage the wires close to the latter welding means, and means for rotating the rod as the fabric is fed forward, so that the grooves constantly retain the wires in their correct position.

7. Apparatus for making an electrically welded wire fabric with diamond meshes comprising means for successively drawing single inclined wires across selvedge wires, a plurality of welding dies on die arms adapted to weld the said wires to the selvedge wires to form a partly finished fabric, a shaft on which the die arms are pivotally mounted, means for turning the shaft through a small angle, yielding means tending to press the die into contact with the wire and means operable on rotation of the shaft to move each die arm to bring its die out of contact with the wire, means for successively drawing single oppositely inclined wires across the partly finished fabric, and means for welding them to the wires of the partly finished fabric.

8. Apparatus for making an electrically welded wire fabric with diamond meshes comprising means for successively drawing single inclined wires across selvedge wires, a plurality of welding dies on die arms adapted to weld the said wires to the selvedge wires to form a partly finished fabric, a shaft on which the die arms are pivotally mounted, means for turning the shaft through a small angle, a key on the shaft engaging and having play in a peripheral slot in each die arm, a spring acting between said key and each die arm tending to press the die against the wire, means for successively drawing single oppositely inclined wires across the partly finished fabric and means for welding them to the wires of the partly finished fabric.

JOSEPH GASKELL.